United States Patent [19]
Yasuda et al.

[11] Patent Number: 4,739,431
[45] Date of Patent: Apr. 19, 1988

[54] THIN-FILM MAGNETIC HEAD

[75] Inventors: Syuhei Yasuda; Katubumi Koyanagi, both of Nara; Hideyoshi Yamaoka, Matsubara, all of Japan

[73] Assignee: Sharp Kabushiki Kaisha, Osaka, Japan

[21] Appl. No.: 790,221

[22] Filed: Oct. 22, 1985

[30] Foreign Application Priority Data

Oct. 22, 1984 [JP] Japan .................. 59-223577

[51] Int. Cl.⁴ .............................. G11B 5/147
[52] U.S. Cl. .................... 360/126; 360/129
[58] Field of Search ............ 360/113, 126, 129

[56] References Cited
U.S. PATENT DOCUMENTS 4,191,983  3/1980  Gibson ............... 360/126 X
4,520,413  5/1985  Piotrowski ............. 360/113

Primary Examiner—A. J. Heinz
Attorney, Agent, or Firm—Birch, Stewart, Kolasch & Birch

[57] ABSTRACT

One of the preferred embodiments of the present invention provides an entirely novel thin-film magnetic-head assembly for a digital-signal recording/reproducing system using multiple tracks. The assembly comprises electronic-circuit components including a combined capacitor/resistor a constant-current source, an amplifier, and an analogue-signal multiplexer, all located inside a casing that surrounds the thin-film magnetic-head. These electronic circuits are present on the upper and lower surfaces of the casing and are connected by means of an elastomer so that these circuits are integrally connected to the thin-film magnetic head.

The thin-film magnetic head of the casing may alternatively be bent and extended so that electronic-circuit components can be mounted to it.

4 Claims, 4 Drawing Sheets

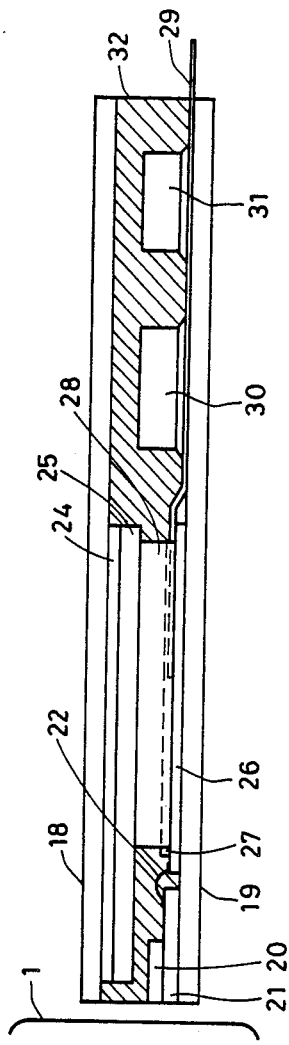
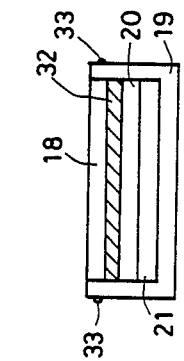
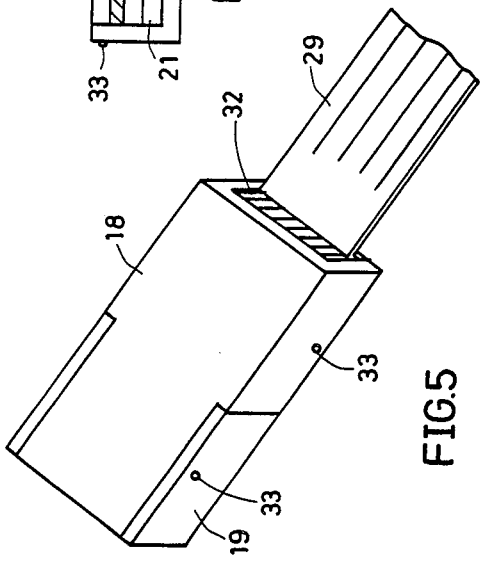
FIG.4
FIG.6
FIG.5

THIN-FILM MAGNETIC HEAD

BACKGROUND OF THE INVENTION

1. Field of the Invention

The present invention is an improved thin-film magnetic head device, specifically a thin-film magnetic head modeled after thin-film magnetic heads which reproduce digitally recorded signals from magnetic tape.

2. Description of the Related Art

Conventional pulse code modulation (PCM) devices used to reproduce pulse-coded modulation signals recorded on multiple tracks require many electronic-circuit components in the periphery of the magnetic head assembly unit. FIG. 1 shows a typical example of a conventional device used to reproduce PCM signals recorded on multiple tracks. The PCM signals recorded on magnetic tape 1 are reproduced by the playback head 2, and are then amplified to the needed level by amplifier circuit 3. The amplified PCM signals are then subjected to waveform equalization by the waveform equalizer circuit 4 after which they are sent to level detection circuit 5 and then converted into digital pulse signals by decoding circuit 6. This digital information is then input to the digital signal processing circuit 7, where it is demodulated and subjected to phase correction. These demodulated signals are then converted to analogue signals by D/A converter 8 and output at audio signal output terminal 9.

Thus, in the device shown in FIG. 1, it is necessary to have a number of circuits following amplifier circuit 3 to correspond to the number of tracks present in the tape. Taking this into account, one arrangement proposed in the prior art had a circuit format in which a number of circuits are inserted between tracks so that the number of circuits can be reduced to a minimum. FIG. 2 denotes a typical circuit configuration found in one of the prior art arrangements. FIG. 2 is a block diagram of circuits in the periphery of the magnetic reproducing head used to execute a time-sharing process. In this process, constant-current source 10 delivers constant current to the yoke-type magnetic resistor (YMR) 11 (in this case the reproducing thin-film magnetic head itself), and as a result, a specific voltage signal is generated by the varied magnetic resistance. A high-pass filter composed of capacitor 12 and resistor 13 filters out the DC components, and the resultant AC signal is then amplified by amplifier circuit 3. These AC signals, reproduced and amplified by multiple tracks, are then selected in sequence by analogue multiplexer 14, and converted again into digital signals by A/D converter 15. These digitalized signals are then processed by digital waveform equalizer circuit 16 to eventually generate signal 17.

Nevertheless, as shown in FIG. 2, even when the time-sharing process is executed, the conventional configuration still includes by necessity those circuits ranging between the yoke-type magnetic resistor (yoke-type magnetic head) 11 and the signal switching circuit 14. In other words, circuits corresponding in number to the number of tracks are needed. Conventionally, those circuits beyond the constant-current source 10 and capacitor 12 are located outside the casing of the magnetic head 11 (YMR), and these circuits are connected to each other by means of wires on a flexible printed circuit board (hereinafter called FPC). This high number of circuit wires degrades the quality of the signals due to the number of tracks, an extremely minimal level of output signal, and a poor signal-to-noise (S/N) ratio. A high data error rate results, hampering adequate use.

FIG. 3 is a sectional view of one conventional magnetic head assembly. In FIG. 3, yoke-type magnetic resistance is generated inside ferrite substrate 21 and protection glass 20. To strengthen protection and increase magnetic shielding, the magnetic heads are mounted inside metal casings 18 and 19. Connection between the magnetic heads and the external reproducing circuits is achieved by bonding said flexible printed circuit board 23 with metal casing 19. Magnetic head and flexible printed circuit board 23 are connected by wire and or other form of wire 22. The magnetic heads are connected in turn to external circuits by means of the flexible printed circuit board. Space inside metal casings 18 and 19 is filled with molded resin 32. The conventional head-installation method described above could potentially generate many errors due to low output signals and a poor S/N ratio for all data. This unwanted phenomenon as mentioned earlier, increases in proportion to the number of tracks in the tape, thus resulting in critical problems in actual use.

OBJECTS AND SUMMARY OF THE INVENTION

In light of the disadvantages present in the conventional arrangements as described above, the present invention securely minimizes the problems mentioned above by using an entirely novel thin-film magnetic head assembly.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those who are skilled in the art from the following detailed description.

One of the preferred embodiments of the present invention provides an entirely novel thin-film magnetic-head assembly for a digital recording/reproducing device using multiple tracks. The above device is comprised of the following: various electronic circuit components including a combined capacitor/resistor, a constant-current source, a reproduced-signal amplifier, and an analogue multiplex. All are located inside a casing surrounding the thin-film magnetic head(s), and those circuits on the upper and lower surfaces of said casing are connected to each other by means of an elastomer. These circuits are thereby integrally connected to said thin-film magnetic head(s).

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 is a sectional view of a prior art PCM-signal reproducing head assembly;

FIG. 4 is the enlarged sectional view of the thin-film magnetic-head assembly representing one of the preferred embodiments of the present invention;

FIG. 5 is the perspective view of the thin-film magnetic-head assembly shown in FIG. 4;

FIG. 6 is the front view of the thin-film magnetic-head assembly shown in FIG. 4.

DESCRIPTION OF THE PREFERRED EMBODIMENTS

Figure 1:
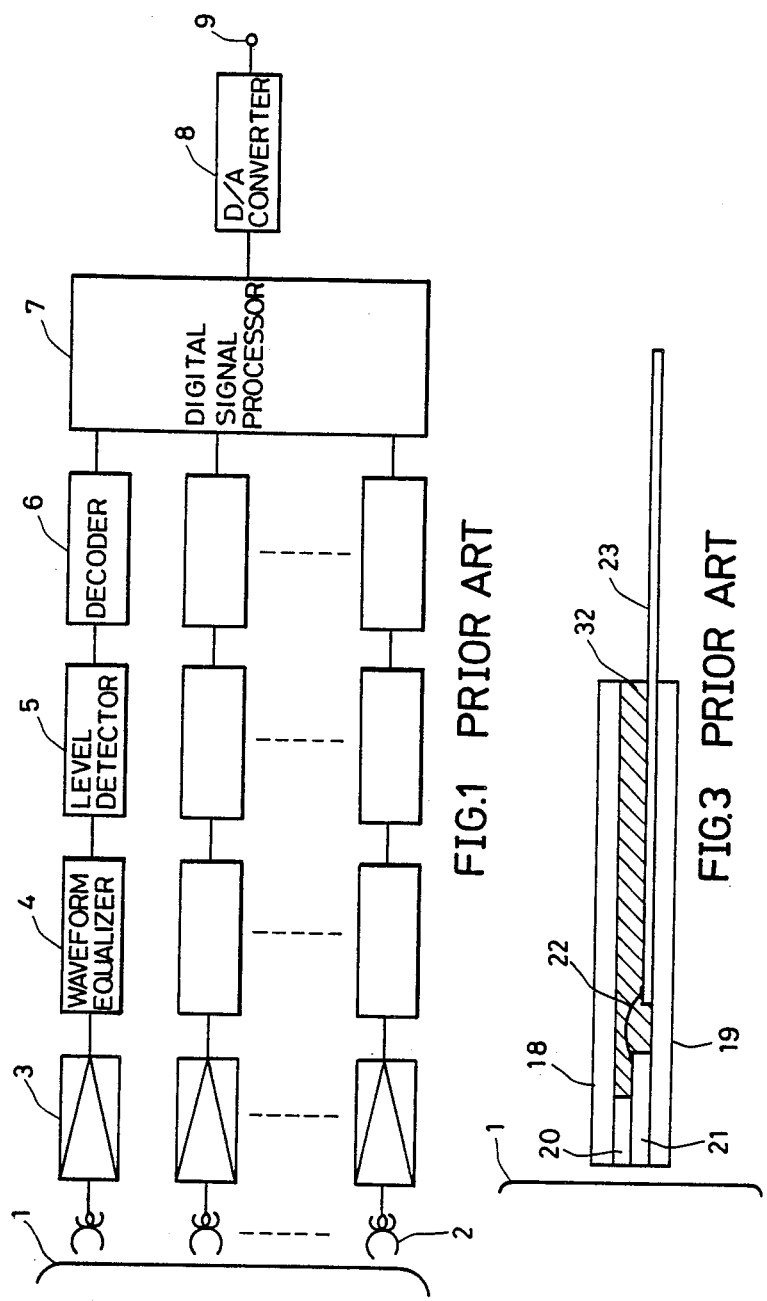
FIG. 1 is a block diagram of a prior art multi-track PCM-signal reproducing circuit.
Figure 2:
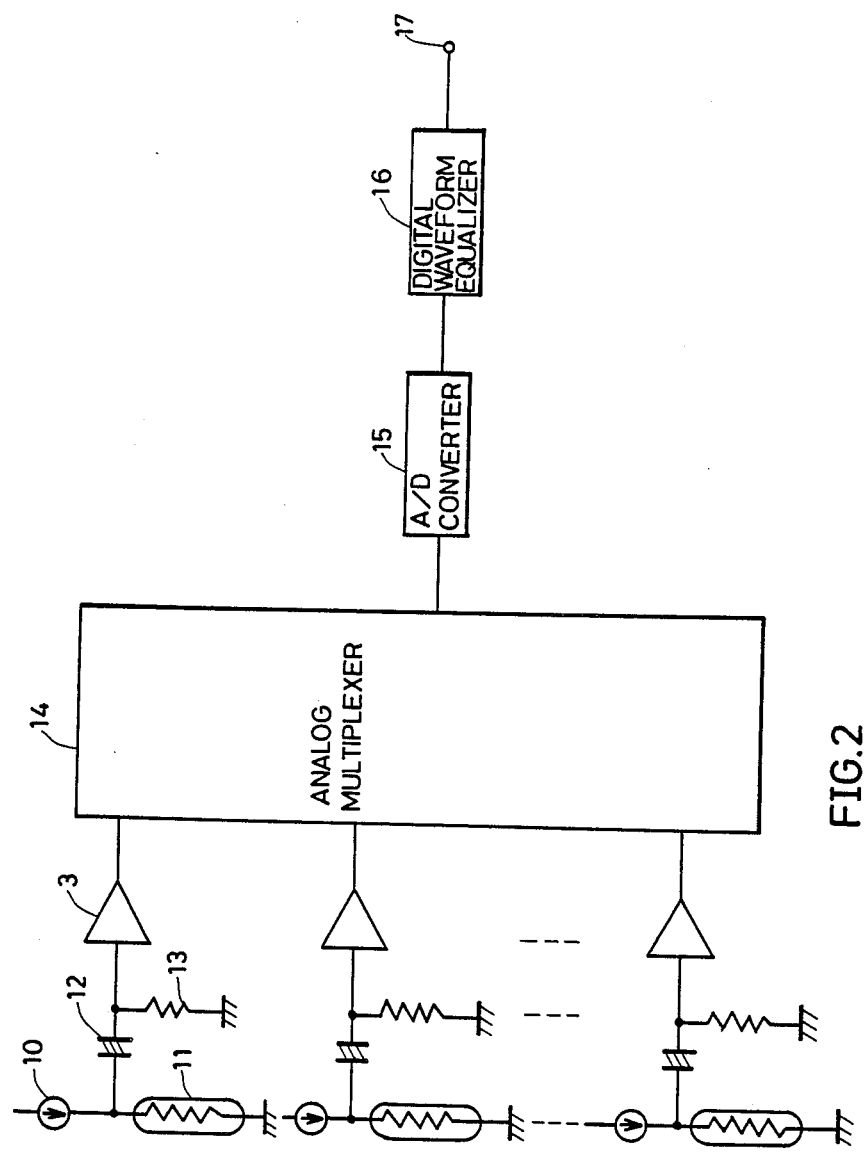
FIG. 2 is a block diagram of a magnetic head used for reproducing PCM-signals combined with peripheral circuits, a configuration suited for executing time-sharing process.

Referring in general to the drawings and with particular reference to FIG. 4, an enlarged sectional view of the thin-film magnetic-head assembly representing one of the preferred embodiments of the present invention is shown. The thin-film magnetic-head assembly is installed in a position opposite magnetic tape 1. Upper and lower surfaces 18 and 19 of the metal casing and the yoke-type magnetic resistance element (YMR) protection glass 20 are mounted on the ferrite substrate 21. In addition, the thin-film magnetic-head assembly is also provided with: fine wire (e.g. wire bond) 22, substrates made of either ceramic or other hard material 24 and 26, capacitor 25, resistor 27, elastomer 28, flexible printed circuit board (FPC) 29, amplifier combined with analogue-signal multiplexer IC circuit 30, constant-current source 31, and the molded resin which fills all remaining space in the metal. Upper and lower surface 18 and 19 of the metal casing are provided with either ceramic or hard printed circuit boards 24 and 26, respectively. A number of monolithic capacitors (or thin-film capacitors) 25 are installed on said printed circuit board 24, whereas a number of chip resistors (or thick-film resistors) 27 are installed on said printed circuit board 26. Both of the printed circuit boards 24 and 26 are electrically connected to each other via elastomer 28. One end of the flexible printed circuit board 29 is connected to printed circuit board 26, while the other end provides external connection through metal casing 19. To improve the S/N ratio, circuit 30, comprised of an amplifier and an analogue multiplex integrated circuit (IC) is installed on flexible printed circuit board 29 inside the metal casing 19. Considering the complexity of wiring, the constant-current source IC circuit 31 is also installed on the flexible printed circuit board 29, and the inner space of said metal casing 19 is entirely filled with molded resin 32 to simplify the wiring.

FIG. 5 is the external view of the thin-film magnetic-head assembly shown in FIG. 4. To ensure precise connection between elastomer 28 and substrates 24 and 26, the metal casings 18 and 19 are securely supported by holders 33. The flexible printed circuit board 29 is connected to the A/D converter of the external circuit and to the power source. FIG. 6 is the front view of the thin-film magnetic-head assembly shown in FIG. 4.

Figure 7:
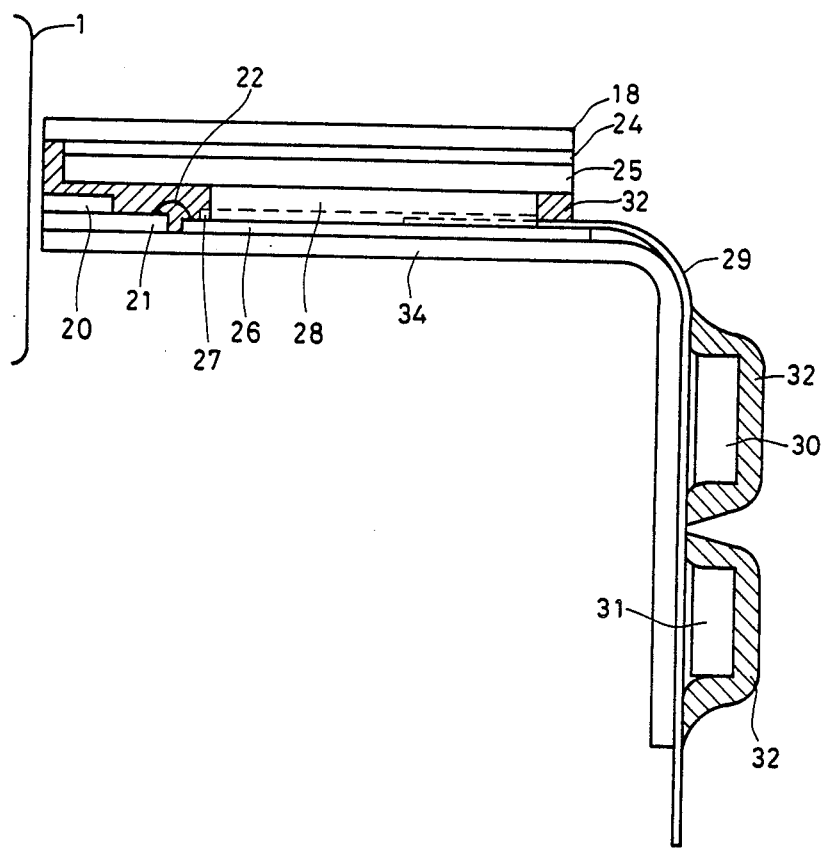
FIG. 7 is the enlarged sectional view of the thin-film magnetic-head assembly representing another preferred embodiment of the present invention.

FIG. 7 is the enlarged view of the thin-film magnetic-head assembly denoting another preferred embodiment of the present invention. It shows a bent FPC configuration shown in FIG. 4. In FIG. 7, the bottom surface 34 of the metal casing is bent in a "L" shape and flexible printed circuit board 29 exits the metal casing at the bottom on the metal casing. IC circuit 30 covered by molded resin 32 and amplifier and analogue multiplexer as well as the constant-current source IC circuit 31 are located on FPC 29. Considering the movement of the thin-film magnetic head in the direction of the magnetic tape 1, such the bend-and-extended bottom surface of the metal casing 34 has an advantageous depth which is shorter than that of the metal casing shown in FIG. 4. This provides a significant advantage in actual use. In addition, since the FPC 29 itself is in a position perpendicular to the magnetic head the FPC can be connected to external circuits very easily. As is shown in FIGS. 4 through 7, provision of various electronic-circuit components including a combined capacitor/resistor; a signal amplifier; an analogue-signal multiplexer; and a constant-current source, located either inside the metal casing as part of the thin-film magnetic-head or on the flexible printed circuit board of the metal casing, results in following advantages:

1. Since even a minimal signal output from the magnetic head can be fed to the amplifier over the shortest possible distance, a satisfactory S/N ratio is ensured, thus allowing the system to generate noise-free large-magnitude analogue signals before output.
2. Conventionally, use of multi-track tape requires a large number of wires which generate noise; in addition, wire distribution becomes difficult due to the greater sizes of wire bundles. The preferred embodiment of the present invention provides easier wire handling since multi-tracks can be contained in a signal line, and the provision of an analog-signal multiplex in the signal line, and the provision of an analogue-signal multiplex in the signal processing system, ensures high signal-to-noise ratio.
3. The thin-film magnetic film assembly of the present invention uses multi-tracks in the casing, as shown in FIG. 5, yet a minimum number of wires exiting flexible printed circuit board 29 are required, still ensuring output of a large-magnitude signal. This allows the operator to easily handle the magnetic head.
4. Since part of the head assembly can be bent as shown in FIG. 7, operators can easily install the magnetic head assembly in the limited space available.

Note that the A/D converter may also be installed on the head assembly if there is available space inside the head casing. If this method is applied, the FPC 29 outputs only digital signals. Application of alloy material featuring high magnetic permeability (e.g. "permalloy" (Ni-Fe 79% a alloy) in the metal casing effectively shields magnetism.

As is clear from the above description, according to the preferred embodiments of the present invention, this digital-signal recording and reproducing device dealing with multi-track signals does not require a number of circuit-wires for distribution purposes. As a result, the signal quality can be satisfactorily maintained without any degradation, drastically minimizing data signal errors.

The present invention being thus described, it will be obvious that the same may be varied in many ways. Such variations are not to be regarded as a departure from the spirit and scope of the present invention, and all such modifications are intended to be included within the scope of the following claims.

What is claimed is:

1. A thin-film magnetic-head assembly for use in a digital signal recording/reproducing system containing multiple tracks wherein comprising:
    a thin-film magnetic head;
    a metal casing surrounding said thin-film magnetic head;

a combined capacitor/resistor in the metal casing;

a constant-current regulated power source in the metal casing;

an amplifier in the metal casing;

an analog-signal multiplexer in said metal casing;

said magnetic head, said capacitor/resistor, said power source, said amplifier, and said analog-signal multiplexer being electrically connected as a circuit contained in said casing;

and an elastomer in the metal casing, wherein said elastomer electrically connects the circuit elements in the metal casing.

2. The thin-film magnetic-head assembly defined in claim 1 wherein said thin-film magnetic head includes a yoke-type magnetic resistance element.

3. The thin-film magnetic-head assembly defined in claim 1 wherein an upper and lower surface of said metal casing are coupled, while circuits on the upper and lower surfaces of said metal casing are connected by means of an elastomer.

4. The thin-film magnetic-head assembly defined in claim 1 wherein the thin-film magnetic head of said metal casing has a base portion which is bent and extended so that electronic-circuit components can be mounted, to it.

* * * * *